UNITED STATES PATENT OFFICE.

RICHARD KUBESSA, OF KALK, NEAR COLOGNE, GERMANY.

BREWING PROCESS.

949,581.

Specification of Letters Patent. Patented Feb. 15, 1910.

No Drawing.

Application filed July 11, 1906. Serial No. 325,724.

*To all whom it may concern:*

Be it known that I, RICHARD KUBESSA, a citizen of Germany, residing at 8 Hauptstrasse, Kalk, near Cologne-on-the-Rhine, Germany, have invented a new and useful Improved Brewing Process; and I do hereby declare that the following is a full and exact description of the invention.

This invention concerns an improved process for brewing with malt divided and separated into three different products, namely, grist, flour and hulls. By the term grist, I mean all those parts resulting from the crushing of the malt which are of a granulous nature and larger than the parts called the flour. In the latter expression all those crushed products which can pass through a sieve of more than 400 meshes to the square centimeter, are comprised. The "hulls" are the outer cellulose husks of the grain.

It is already known to employ in brewing the malt divided into two products, hulls and flour, and to add to the flour mash the wort rich in diastase got by treating the hulls with water. Further, by my previous patents—German No. 151,144 and British No. 15,935/1903—it is known to employ in brewing the malt divided into the above-named three products, namely, grist, flour, and hulls, which method was proved to be much superior to the former brewing method with the malt divided into two products only. But the method of treating these three products and operating with them corresponding to the brewing process described in my above said patents was not yet quite perfect. That process which forms my present invention, is much better and more perfect and offers great advantages to the brewer over the hitherto known processes.

My invention consists in the following: The first of the above-named malt-products, namely, the grist is mashed, then the temperature of the mash raised to a degree suitable for converting the starch into malto-dextrin, and then, this conversion having been done, the mash is boiled for obtaining the greatest gain and the utmost utilization of the malt. Then the third of the three above-mentioned malt-products, namely, the hulls is added to the boiled grist-mash for lowering its temperature. After this the second of the above mentioned malt products, the flour, is added to the boiled grist-mash with admixed hulls, having now its temperature already lowered, as aforesaid, and by this addition of the flour the temperature of the whole is in one operation reduced quickly and suddenly to the desired temperature, suitable for the saccharification, *i. e.* for the conversion of the starch of the malt into malto-dextrin, as for instance to a temperature of about 156 to 167° F. Now, this conversion of that starch which is contained in the malt-flour lastly added, being reached, the wort is drained off, clarified and boiled in the usual manner.

In the described process, after having made and boiled the grist-mash, the hulls which serve for bringing its temperature from the boiling to a lower degree, may be used either in their dry or wet state, in the latter state they are mashed. When used in a wet state, the whole mash of hulls may be used as well as only one of its two components, these components consisting of either solid parts, namely, the extracted hulls, or husks, or, the liquid, namely, the water in which the hulls were soaked. Further in the described process, after having lowered the temperature of the boiled grist-mash by adding to it the hulls, the flour which is then added for obtaining the conversion-temperature, may be added either in a dry state, *i. e.* without adding any water, or in a wet state, *i. e.* mixed with water.

For the most cases, I prefer to add the flour in the form of a malt milk, obtained by mixing the flour with cold water in the mash-tun, and being of the same temperature as cold water.

My described new process, by employing the third malt-product, namely, the hulls, for reducing the temperature of the boiled grist-mash before adding the second malt-product, namely, the flour, offers the advantage that in each case the flour is allowed to be mixed with much less water, than otherwise, for attaining the desired temperature for the conversion of starch, and that therefore a mash of much higher consistency and a forewort, less in quantity, but better in quality, that is with a higher percentage of maltose and malto-dextrin, is obtained. This is of great help for obtaining the greatest possible quantity of extract, as the after-worts are now allowed to be correspondingly augmented or multiplied without augmenting the whole quantity of wort to which the capacity of the brewing pan corresponds.

A modification of the described process offers still extra advantages. This modification consists therein that, after having mashed the grist and brought the grist-mash to the boiling, a mash is made from the whole hulls, but from this hull-mash only the liquid or the washing water separated from the extracted hulls, or the husks, is employed for adding it to the boiling or boiled grist-mash for reducing the temperature of the latter, while those of the hulls which have still grist-particles not separated by the crushing, are added to the grist-mash at its boiling temperature, and thus the starch contained in said grist-particles is also transformed into paste. This will be very important for a quick liquidation of the starch-grains and for obtaining the greatest possible quantity of extract. In carrying out this modified process the hulls with adherent grist-particles which have been added to the boiling grist-mash, may still be boiled together with the latter for a short time, by which the transforming of starch into paste will be still more perfected and later the quantity of extract obtained will be still further increased. If, however, the malt to be used has rough husks, the hulls with adherent grist-particles are not allowed to be boiled together with the grist-mash. Where, after the draining-off and before boiling the wort a so-called after-conversion is to be made, that is, where all the particles of starch which might have eventually become decomposed by the boiling of the mash, are to be converted completely into malto-dextrin, and where, in carrying out the present process, the hulls are used in their wet state for being added to the boiled grist-mash, a small quantity of the water in which the hulls were soaked, may be taken and put aside to serve as the diastase-solution which is necessary for the said after conversion. But in most cases, of course, a special mashing of the hulls or the preparation of extract-water of the same which would serve as a diastase-solution, will be superfluous and may be omitted, because the flour by itself contains diastase enough for converting into maltodextrin its own starch as well as that of the grist-particles clinging still to the husks and being transformed into paste by the boiling together with the grist-mash. In these cases the process may be carried out much more simply and quickly. If however a special mashing of the hulls for obtaining the extract-water serving as diastase-solution is thought to be necessary, and therefore carried out, of course, the extracted hulls, after having been taken from the water, may be withheld from the further mashing, and only the extract-water of the same, after having a quantity for the latter after-conversion separated from it, may be added to the boiled grist-mash for reducing its temperature before the flour or flour-mash is added according to the present process.

Claims:

1. Improved brewing process with malt separated into three products, namely, grist, flour and hulls, consisting in mashing the grist separately, boiling said grist, adding thereto at least a part of the hulls whereby the temperature of the mash is lowered, then adding the flour whereby the temperature of said mash is suddenly reduced to the well-known conversion temperature and holding said mash at said temperature for a certain time for converting the starch into malto-dextrin.

2. Improved brewing process with malt separated into three products, namely, grist, flour and hulls, consisting in mashing the grist separately, boiling said grist, adding thereto only the water of the hulls mashed in the mean time whereby the temperature of the mash is lowered, then adding the flour whereby the temperature of said mash is suddenly reduced to the well known conversion temperature and holding said mash at said temperature for a certain time for converting the starch into malto-dextrin.

3. Improved brewing process with malt separated into three products, namely, grist, flour and hulls, consisting in mashing the grist separately, boiling said grist, adding thereto those of the hulls mashed in the meantime, which show still grist particles not separated therefrom by the crushing, then adding thereto the mashing water from the hulls whereby the temperature of the grist mash is lowered, then adding the flour whereby the temperature of said mash is suddenly reduced to the well-known conversion temperature and holding said mash at said temperature for a certain time for converting the starch into malto-dextrin.

Signed this 2d day of July 1906.

RICHARD KUBESSA.

Witnesses:
 BESSIE F. DUNLAP,
 LOUIS VANDORY.